United States Patent
Burgan et al.

(10) Patent No.: US 6,668,169 B2
(45) Date of Patent: Dec. 23, 2003

(54) METHOD FOR COMMUNICATING WITHIN A CHAT TOPIC IN A WIRELESS COMMUNICATION SYSTEM

(75) Inventors: John M. Burgan, N. Palm Beach, FL (US); Jennifer Yates, Margate, FL (US); Dan Troutman, Boynton Beach, FL (US)

(73) Assignee: Motorola, Inc., Schaumburg, IL (US)

(*) Notice: Subject to any disclaimer, the term of this patent is extended or adjusted under 35 U.S.C. 154(b) by 89 days.

(21) Appl. No.: 10/025,895

(22) Filed: Dec. 19, 2001

(65) Prior Publication Data

US 2002/0094803 A1 Jul. 18, 2002

Related U.S. Application Data

(62) Division of application No. 09/503,451, filed on Feb. 14, 2000.

(51) Int. Cl.[7] ............................. A04Q 7/20; H04M 3/42
(52) U.S. Cl. ............................ 455/435.1; 455/414.1; 455/412.1; 455/418; 709/219
(58) Field of Search ........................... 455/410–415, 455/435, 3.06, 517–518, 551, 186.1, 344, 418, 435.1–435.3; 379/202–206; 709/203, 205–207, 217, 218, 219, 204, 328, 329; 340/7.21, 7.22, 7.23, 7.29; 345/758

(56) References Cited

U.S. PATENT DOCUMENTS

| | | | | |
|---|---|---|---|---|
| 5,764,916 A | * | 6/1998 | Busey et al. | 709/227 |
| 5,793,365 A | * | 8/1998 | Tang et al. | 345/329 |
| 5,949,326 A | * | 9/1999 | Wicks et al. | 340/286.01 |
| 5,987,525 A | * | 11/1999 | Roberts et al. | 709/248 |
| 6,061,570 A | * | 5/2000 | Janow | 455/458 |
| 6,345,290 B2 | * | 2/2002 | Okada et al. | 709/204 |
| 6,522,886 B1 | * | 2/2003 | Youngs et al. | 455/450 |

* cited by examiner

*Primary Examiner*—Sinh Tran
*Assistant Examiner*—Eliseo Ramos-Feliciano
(74) *Attorney, Agent, or Firm*—Randi L. Dulaney

(57) ABSTRACT

A method within a wireless communication system (10), provides for communicating a chat topic (82) between a chat server (48) and a plurality of wireless communication devices (36) The wireless communication device (36) sends a request for active chat topics to the chat server (48). In response the chat server (48) sends a list of the active chat topics along with a chat address (178) for identifying the chat topic (82) and one or more chat preferences (175). The wireless communication device (36) stores the chat address (178) and the chat preferences (175) for the chat topic (82). The wireless communication device (36) performs identified operations associated with the chat preferences (175) in response to receiving a message comprising the chat address (178) and a chat message (180).

8 Claims, 15 Drawing Sheets

METHOD FOR COMMUNICATING WITHIN A CHAT TOPIC IN A WIRELESS COMMUNICATION SYSTEM

CROSS REFERENCE TO RELATED APPLICATIONS

This is a divisional application of pending U.S. application Ser. No. 09/503,451 filed Feb. 14, 2000 and assigned to Motorola, Inc.

BACKGROUND OF THE INVENTION

1. Field of the Invention

This invention relates in general to wireless communication systems and in particular to real time communication among a plurality of wireless communication devices within a wireless communication system.

2. Description of the Related Art

Historically, wireless communication devices, such as pagers, have had the ability to receive a message sent from a wireless communication system, and perform standard functions in response to the message receipt such as storing the message, displaying the message, or alerting the user of receipt of the message. The messages are typically a numeric message such as a phone number, or an alphanumeric message containing one unique piece of information such as "meeting in my office at 6:00 pm." The user is alerted of receipt of a new message by an audible alert or a vibratory alert. The display of many wireless communication devices includes a message indicator for each message it has received and stored in memory.

Today's wireless communication devices are no longer restricted to these standard functions. For example, two-way pagers optimize productivity in a portable package. Two-way pagers function as regular full-text pagers, communicate wirelessly with other pagers, and send and receive e-mail. In many two-way pagers, the combination of an easy to use graphic user interface (GUI), QWERTY keyboard, software programmability, application interface, address book, customizable menu, PC connectivity, and large memory make them ideal for enhanced functionality.

Two-way paging protocols are optimized for one-to-one messaging. Utilizing two-way paging protocols, a first wireless communication device can send a message to another wireless communication device; and the recipient of the message can reply to the sender. The first wireless communication device can also send the same message to a plurality of wireless communication devices; and receive individual replies from each device. In this manner, real time communication between two wireless communication devices is achieved.

One drawback of the current two-way paging systems is the inability to send the complete recipient list to every wireless communication device receiving the same message when a message is sent to a plurality of wireless communication devices. This leads to difficulty for an individual recipient to reply to not only the original sender but also all other recipients of the message.

A second drawback of the current two-way paging systems when a message is sent to a plurality of wireless communication devices is that even if a person did know the people to reply to the system would have to send an individual page to each of them. For example, when a message is sent to five other wireless communication devices, five individual messages must be encoded and sent over the air. Optionally, a temporary news service address could be set up by the infrastructure, but this would take additional time to page each wireless communication device; and add it to the news service group before sending out the message.

Chat functions are very popular on the Internet. Chat functions allow the simultaneous access to a message or set of messages by multiple users, with each user capable of inputting a message or set of messages to the chat. The message is related to the devices (typically computers) of the other users who have chosen to participate in that chat. Then the other users can respond with their own messages, which are likewise relayed to all the devices. In this manner, chat functions offer real time conversations between users.

The sophisticated design of wireless communication devices today makes them ideal for wireless communication of chat conversations. However, the drawbacks as described previously of current two-way paging protocols and systems make it burdensome to implement a chat conversation with three or more wireless communication devices.

What is needed is a method and apparatus in which a plurality of wireless communication devices can communicate efficiently and in substantially real time with all other wireless communication devices within a particular group to implement chat functions wirelessly.

DETAILED DESCRIPTION OF THE INVENTION

Figure 1:
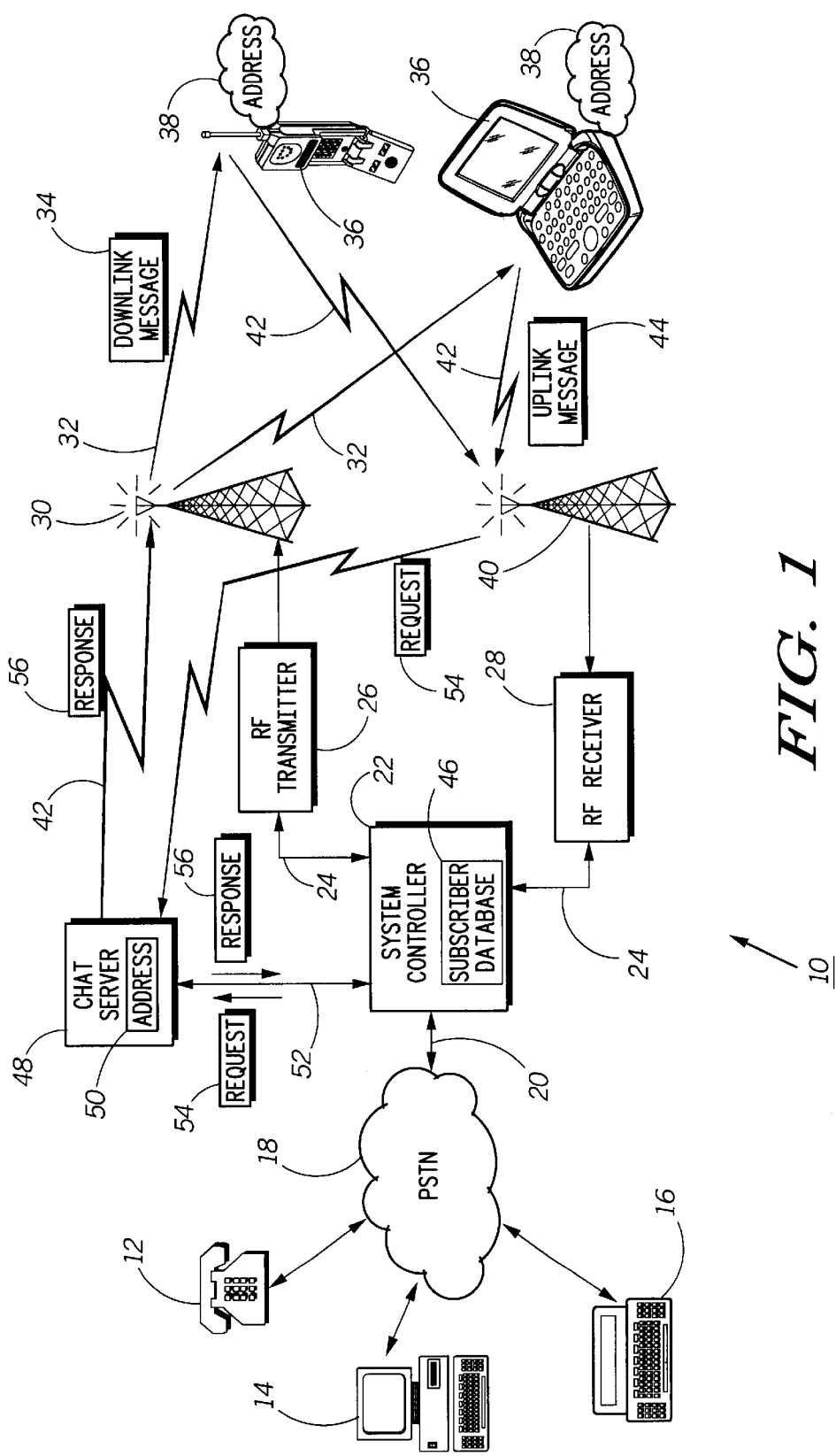
FIG. 1 is an electronic block diagram of a wireless communication system.

Referring to FIG. 1, an electronic block diagram of a wireless communication system 10 is shown. The wireless communication system 10 comprises a message input device, such as a telephone 12, a computer 14, or a desktop messaging unit 16, connected through a conventional public switched telephone network (PSTN) 18 through a plurality of telephone links 20 to a system controller 22. The telephone links 20 may be a plurality of twisted wire pairs, a fiber optic cable, or a multiplexed trunk line.

The system controller 22 is coupled to and oversees the operation of at least one radio frequency (RF) transmitter 26 and at least one radio frequency (RF) receiver 28 through one or more communication links 24. The communication links 24 typically are twisted pair telephone wires, and additionally can include radio frequency (RF), microwave, or high quality audio communication links. The radio frequency transmitter 26 and the radio frequency receiver 28, which typically are used in message store and forward stations that encode and decode inbound and outbound messages into formats that are compatible with landline message switch computers and personal radio addressing requirements, such as cellular message protocols. The system controller 22 can also function to encode and decode wireless messages that are transmitted to or received by the radio frequency transmitter 26 or the radio frequency receiver 28. Telephony signals are typically transmitted to and received from the system controller 22 by telephone sets such as the telephone 12 or the wireless communication device 36. The system controller 22 encodes and schedules outbound messages such as a downlink message 34, for transmission by the radio frequency transmitter 26 via a transmit antenna 30 to at least one wireless communication device 36 on at least one outbound radio frequency (RF) channel 32. As illustrated in FIG. 1, the wireless communication device 36 may be, for example, a cellular telephone or a two-way pager. The downlink message 34 may be, for example, a data message. Similarly, the system controller 22 receives and decodes inbound messages such as an uplink message 44 received by the radio frequency receiver 28 via a receive antenna 40 on at least one inbound RF channel 42 from the wireless communication device 36. The uplink message 44 may be, for example, a data message or a reply to a data message.

It will be appreciated that the wireless communication system 10, in accordance with the present invention, may function utilizing any wireless RF channel, for example, a one or two way pager channel, a mobile cellular channel, or a mobile radio channel. Similarly, it will be appreciated that the wireless communication system 10 may function utilizing other types of channels such as infrared channels. In the following description, the term wireless communication system refers to any of the wireless communication systems mentioned above or an equivalent.

Similarly, it will be appreciated that the wireless communication device 36, in accordance with the present invention, may be a mobile cellular telephone, a mobile radio data terminal, a mobile cellular telephone having an attached data terminal, or a two way pager. In the following description, the term "wireless communication device" refers to any of the devices mentioned above or an equivalent.

Each wireless communication device 36 assigned for use in the wireless communication system 10 has an address 38 assigned thereto which is a unique selective call address in the wireless communication system 10. The address 38 enables the transmission of the downlink message 34 from the system controller 22 only to the wireless communication device 36 having that address 38, and identifies the messages and responses received at the system controller 22 from the wireless communication device 36. In one embodiment, each wireless communication device 36 also has a pin number assigned thereto, the pin number being associated with a telephone number within the PSTN 18. A list of the assigned addresses and correlated telephone numbers for each wireless communication device 36 is stored in the system controller 22 in the form of a subscriber database 46.

In a preferred embodiment of the present invention, the wireless communication system 10 includes a chat server 48 coupled to the system controller 22 via a server interface 52. The chat server 48 manages the communication of a plurality of chat discussions, facilitating substantially real time communication among a plurality of wireless communication devices within the wireless communication system 10. The chat server 48 provides numerous services to manage the chat discussions. The chat server 48 also offers various options to the participants to reduce cost or enhance the features of the chat discussion.

The chat server 48 receives a chat request 54 and in response to such receipt, sends a chat response 56. In one embodiment, the chat request 54 is communicated to the chat server 48 via the server interface 52 from the system controller 22 and the chat response 56 is communicated via the server interface 52 to the system controller 22. The system controller 22 then routes the chat response 56 to the requesting device which may be a message input device, such as the telephone 12, the computer 14, or the desktop messaging unit 16, or alternatively may be an individual or a wireless communication device 36. In the following description, the term requester refers to any of the requesting devices mentioned above or an equivalent.

Preferably, the chat server 48 includes a chat server address 50, which is a unique selective call address in the wireless communication system 10. The chat server address 50 enables the transmission, via the inbound RF channel 42, to the chat server 48 of the chat request 54 such as chat service requests, subscription requests, and other information requests from a chat requester which may be an individual or the wireless communication device 36. In response to the chat request 54, the chat server 48 sends the chat response 56, to the requester via the outbound RF channel 32. The chat response 56 may be sent alternatively through the system controller 22 via the server interface 52. Furthermore, the chat server 48 also has a pin number assigned thereto, the pin number being associated with a telephone number within the PSTN 18. The chat server address 50 and correlated telephone number is stored in the in the subscriber database 46 of the system controller 22.

The addition of the chat server 48 to the wireless communication system 10 enhances the operation of the wireless communication system 10 by adding intelligence for multiple wireless communication devices to communicate in substantially real time. The chat server 48 interactively manages the traffic associated with a plurality of chat discussions in an efficient manner.

Figure 2:
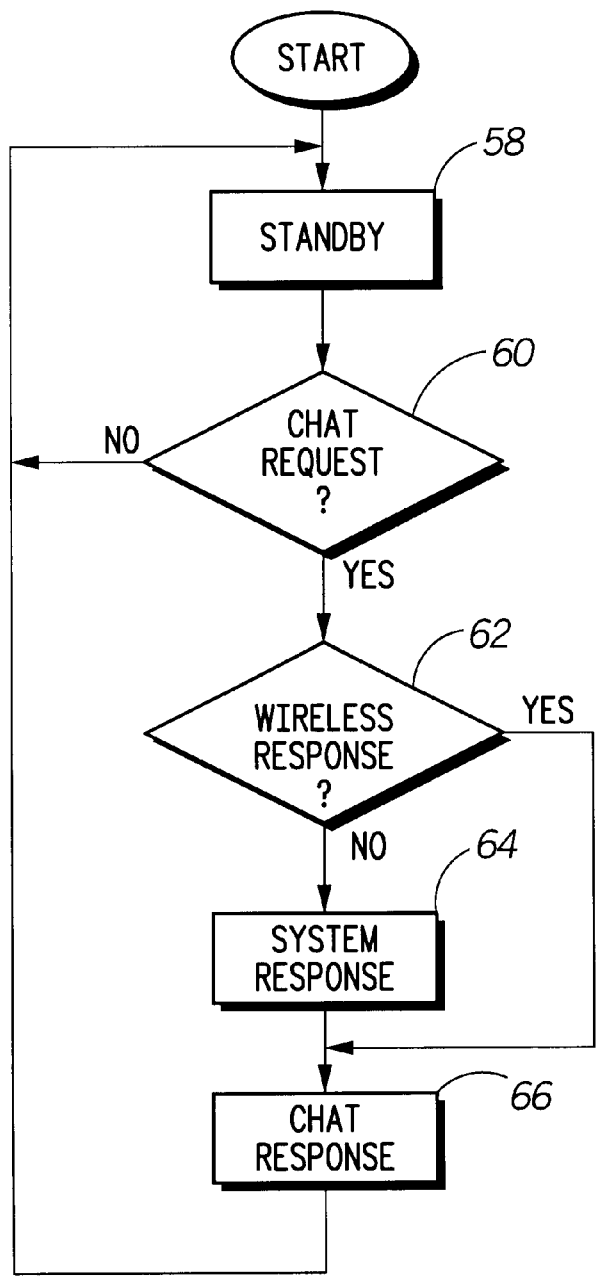
FIG. 2 is a flowchart illustrating communication of chat requests and responses within the wireless communication system of FIG. 1.

FIG. 2 is a flow chart illustrating the communication of the chat request 54 and the chat response 56 within the wireless communication system 10. In Step 58, the chat server 48 is in standby operation. In Step 60, the chat server 48 queries whether a chat request 54 has been received. If no chat request 54 has been received, the chat server 48 returns to the standby operation of Step 58. If a chat request 54 has been received, the chat server 48 processes the chat request 54 and compiles the chat response 56. In Step 62, the chat server 48 determines whether a wireless chat response has been requested. In Step 64, if a wireless chat response has not been requested, the chat server 48 communicates the chat response 56 to the system controller 22 via the server interface 52. If a wireless chat response has been requested, the chat server 48 communicates the chat response 56 via the outbound RF channel 32 to the requester. In Step 66, the chat response 56 is communicated to the requester. Upon communicating the chat response 56 to the requester, the chat server returns to standby operation, Step 58.

Figure 3:
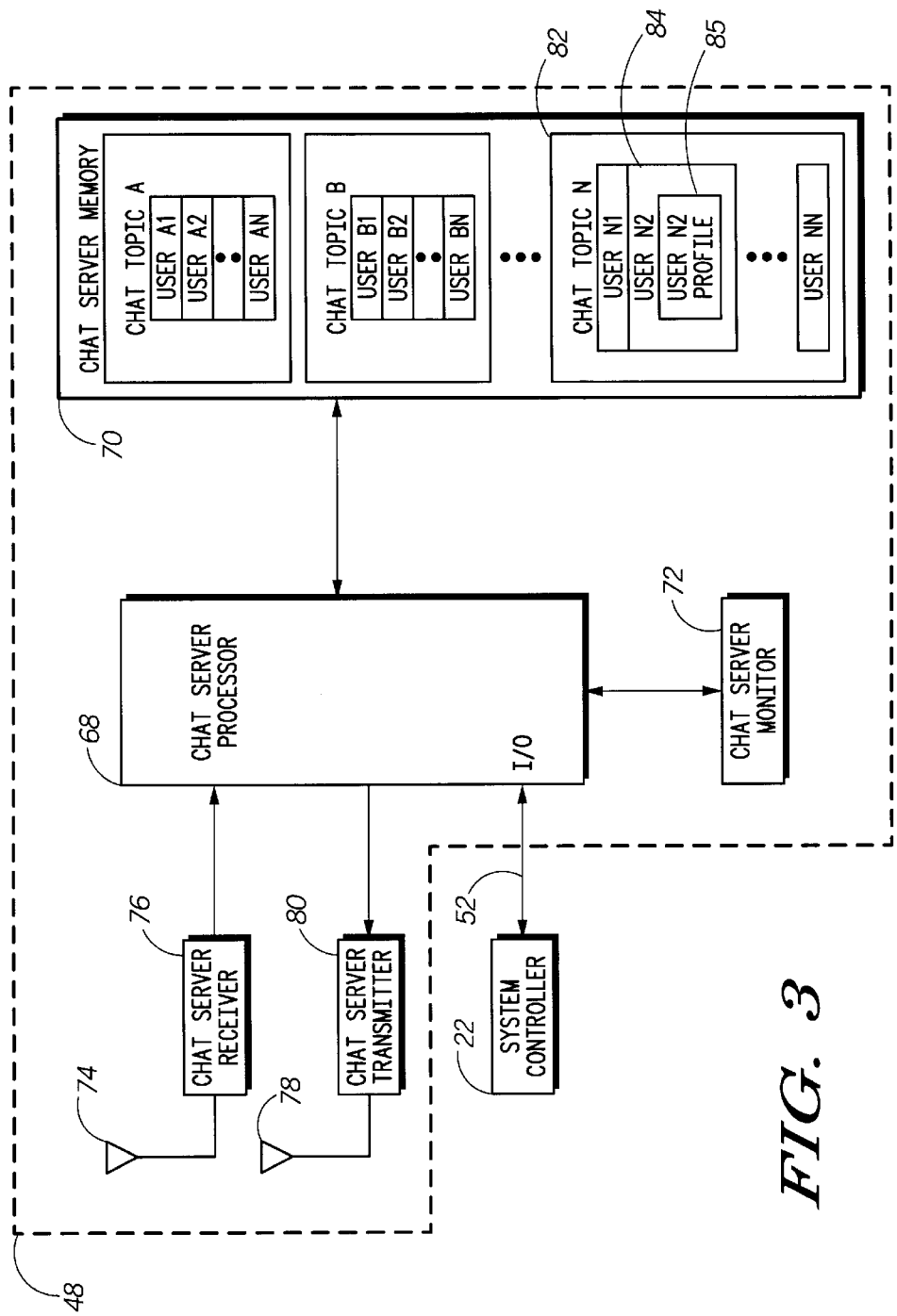
FIG. 3 is an electronic block diagram of a chat server for use within the wireless communication system of FIG. 1.

FIG. 3 is an electronic block diagram of a preferred embodiment of the chat server 48 for use within the wireless communication system 10. The chat server 48 includes a chat server processor 68, a chat server memory 70, a chat server monitor 72, a first chat server antenna 74, a chat server receiver 76, a second chat server antenna 78, and a chat server transmitter 80.

The first chat server antenna 74 intercepts transmitted signals such as the chat request 54 from the wireless communication system 10 received via the inbound RF channel 42. The first chat server antenna 74 is coupled to the chat server receiver 76 which employs conventional demodulation techniques for receiving the communication signals transmitted by the wireless communication system 10 such as the chat request 54.

Coupled to the chat server receiver 76, is the chat server processor 68, utilizing conventional signal processing techniques for processing received chat requests. Preferably, the chat server processor 68 is similar to the MC68328 microcontroller manufactured by Motorola, Inc. of Schaumburg, Ill. It will be appreciated that other similar processors can be utilized for the chat server processor 68, and that additional processors of the same or alternative type can be added as required to handle the processing requirements of the chat server processor 68. The chat server processor 68 receives the chat request 54 from the chat server receiver 76 and processes that request to generate the chat response 56.

To perform the necessary functions of the chat server 48, the chat server processor 68 is coupled to the chat server memory 70, which preferably includes a random access memory (RAM), a read-only memory (ROM), and an electrically erasable programmable read-only memory (EEPROM). The chat server memory 70 preferably stores at least one chat topic 82. The chat topic 82 may be for example a private chat group within a business or social group, a current newsworthy topic, a political viewpoint, a particular sport, or any other topic of interest to a group of individuals. In the following description, the term chat topic refers to any of the chat topics mentioned above or an equivalent. A chat user 84 identification and a user profile 85 for that chat user 84 subscribing to the chat topic 82 is stored along with the chat topic 82 in the chat server memory 70. The user profile 85 includes, for example, billing information, favorite topics, associates, group lists, age, obscenity rating, and optional services. The chat server 48 sends a chat notification when a new chat corresponding to the user profile 85 is initiated.

The chat server transmitter 80 is coupled to the chat server processor 68 and is responsive to commands from the chat server processor 68. When the chat server transmitter 80 receives a command from the chat server processor 68, the chat server transmitter 80 sends the chat response 56 via the second chat server antenna 78 to the wireless communication system 10. The chat server transmitter 80 preferably monitors traffic on the outbound RF channel 32. If the outbound RF channel 32 is busy, the chat server transmitter 80 collects and buffers the chat responses for a period of time and then communicates them as one chat message. This allows efficient use of the outbound RF channel 32. If there is little or no traffic on the outbound RF channel 32, the chat server transmitter 80 sends the chat response 56 individually upon receipt of a command from the chat server processor 68.

The chat server processor 68 is coupled to the chat server monitor 72. The chat server monitor 72 performs various functions relating to the chat discussions. The chat server monitor 72 is preferably programmed with a set of rules regarding chat topics and substance of chat discussions. The chat server monitor 72, for example, may delete chat discussion substance containing obscenity. The chat server monitor 72 may also disallow the creation of a new chat topic containing obscenity. The chat server monitor 72 preferably also tracks traffic from a particular requester or group for billing purposes. Various billing methods are supported for the various types of chats. A flat rate per month, for example, may be charged to allow the user to pick a certain number of public chat topics to subscribe to continuously or as desired. Alternatively, hourly charges or per character charges may be applied to private chat topics. The hourly charge also may be applied to specialty public chat topics. A specialty public chat topic is one active for a short time based on some special event or related topic. One skilled in the art will recognize that any of the billing methods mentioned above or an equivalent are supported by the chat server 48 in accordance with the present invention.

Figure 4:
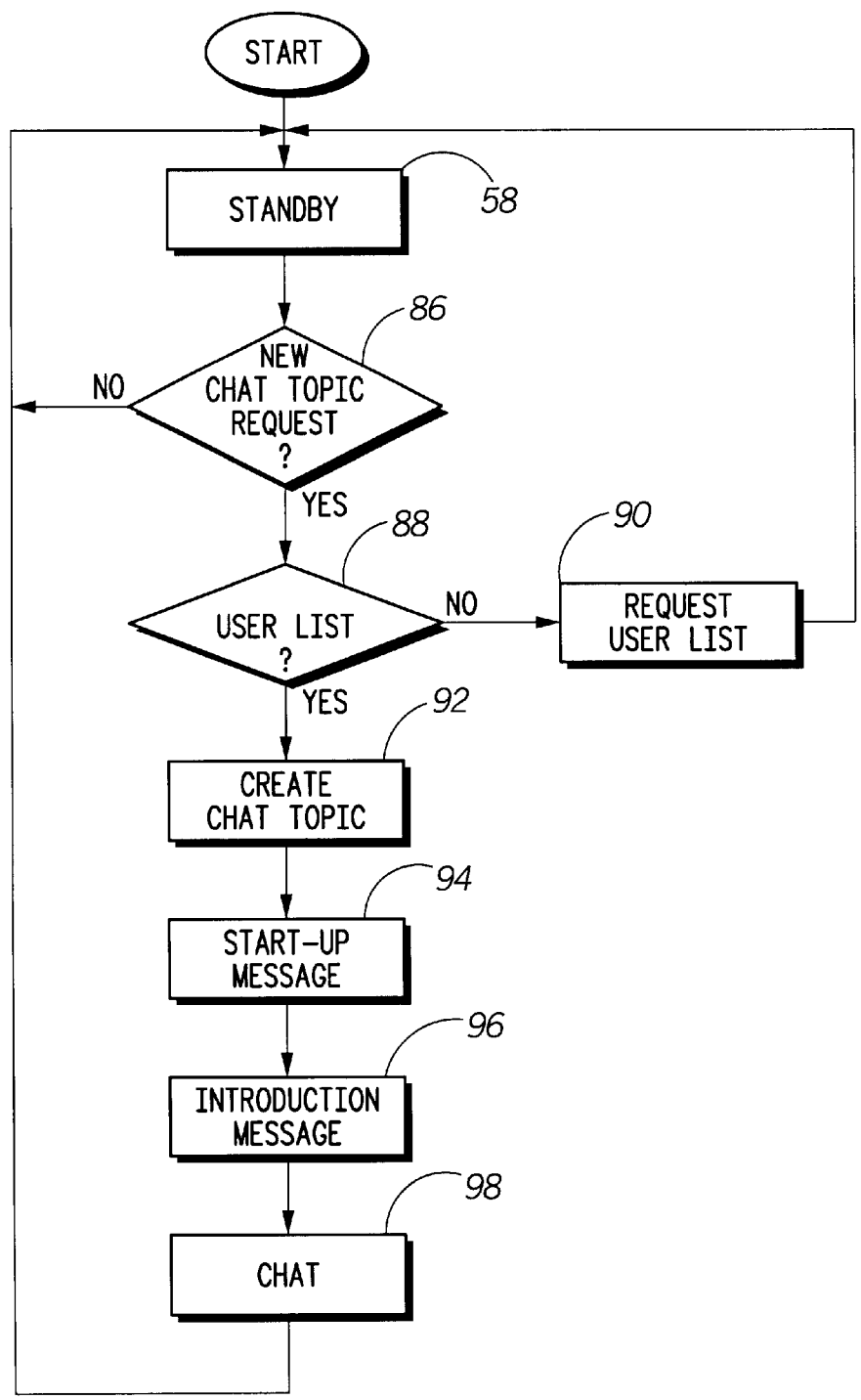
FIGS. 4 through 7 are flowcharts illustrating various embodiments of the operation of the chat server of FIG. 3 in accordance with the present invention.

FIG. 4 is a flowchart illustrating the operation of the chat server 48 in accordance with the present invention. FIG. 4 illustrates the operation of creation of a new private chat topic. A private chat topic is one available only to a specific identified group of subscribers. In Step 58, the chat server 48 is in standby operation. In Step 86, the chat server 48 queries whether a request for a new chat topic has been received. When no request for a new chat topic has been received, the chat server 48 returns to the standby operation of Step 58. When a request for a new chat topic has been received, in Step 88 the chat server 48 determines if a subscriber list is included in the request. The subscriber list is a list of users the requester wishes to include in the chat group for the requested private chat topic. In Step 90, if no subscriber list is included in the request for a chat topic, the chat server 48 sends a request for the subscriber list to the requester; and then returns to standby operation in Step 58. In Step 92, when a subscriber list is included in the request for a chat topic, the chat server 48 creates the new chat topic. Next, in Step 94, the chat server 48 sends a start up message to each user in the subscriber list. The start up message creates an inbox with the new chat topic on the subscriber's device. The subscriber's device preferably is the wireless communication device 36. Next, in Step 96, the chat server 48 sends an introduction message including information about the new chat topic such as the originator and the other subscribers. In Step 98, the new chat topic is active and the subscribers maintain their chat discussion. The chat server 48 then returns to the standby state of Step 58.

Figure 5:
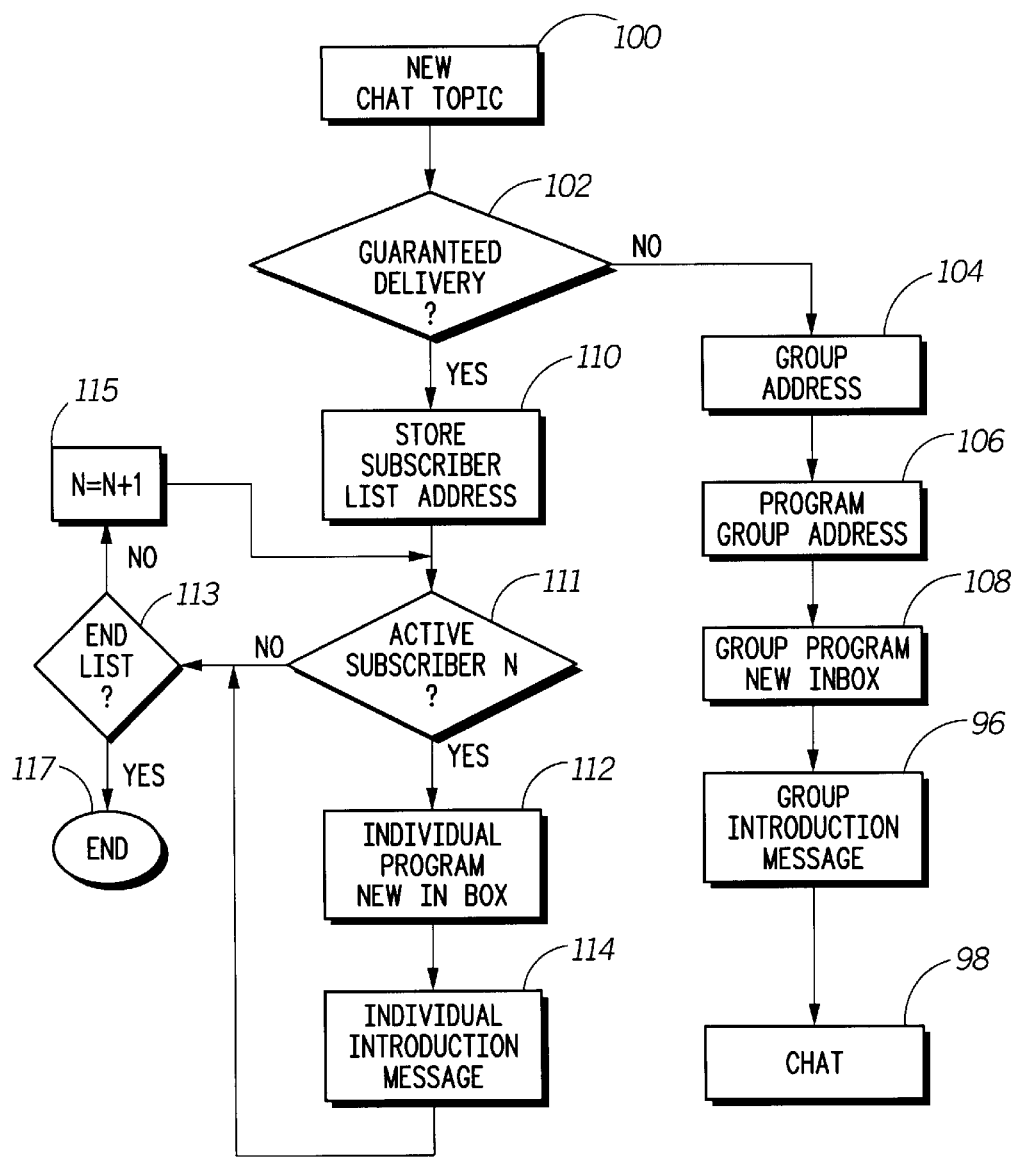

FIG. 5 is a flowchart illustrating the further detail of the operation of the chat server 48. In Step 100, the chat server 48 creates a new chat topic. The chat topic 82 is stored in the chat server memory 70 as previously described in FIG. 3. Next, in Step 102, the chat server 48 determines whether a guaranteed delivery option is associated with the chat topic 82. In Step 104, when there is no guaranteed delivery option, the chat server 48 assigns a group address to the chat topic 82; and next in Step 106 programs the subscriber devices associated with the subscriber list for the new chat topic with the assigned group address. The programming preferably is done wirelessly by the chat response 56 sent over the outbound RF channel 32 to the subscribers' wireless communication devices. Alternatively, the programming of the group address may be accomplished via the system controller 22 or via a programming fixture. Those skilled in the art will recognize that any of the programming methods mentioned above or an equivalent are supported by the present invention. Next, in Step 108, the chat server programs a new chat inbox in each of the subscribers' devices for the new chat. This programming may be accomplished as part of the same message programming the group address or as a separate message after the group address is programmed. In Step 96, the chat server 48 then sends an introduction message to the group address, which is received by all the subscribers whose devices were programmed with that group address. Next, in Step 98, the chat discussion activates for the new chat topic.

In summary, the use of a group address for the private chat as described above is an efficient use of airtime. The various chat messages are only sent as one message to a plurality of users.

Referring back to Step 102, when the guaranteed delivery option is chosen, in Step 110, the chat server 48 stores each chat user 84 on the subscriber list and the address 38 of the chat user's device along with the chat topic 82 in the chat server memory 70. Next, in Step 111, the chat server 48 checks whether the first subscriber on the subscriber list is an active account. In Step 113, when the subscriber is not an active account, the chat server 48 checks for the end of the subscriber list. In Step 117, when the end of the subscriber list has been reached, the process ends. When the end of the subscriber list has not been reached, in Step 115, the chat server 48 increments a counter and next, returns to Step 111 to check the active status of that subscriber account. When the subscriber account is active, in Step 112, the chat server 48 programs a new inbox for the new chat topic individually for each chat user 84 by sending a programming page to the individual address of each wireless communication device for each user on the subscriber list. Next, in Step 114, the chat server 48 sends an introduction message to each individual address for each individual chat user of the subscriber list. The introduction message informs the user that the chat has been formed and acts as an invitation to the user to join the chat. Next, in Step 98, the chat discussion activates for the new chat topic.

The process described above and depicted in FIG. 5 offers the user two choices. The guaranteed delivery option compensates for the wireless environment being inherently error prone and noisy (ie: subject to interference). The non-guaranteed delivery option provides a less expensive, more efficient channel utilization option for both the service provider and the user.

Figure 6:
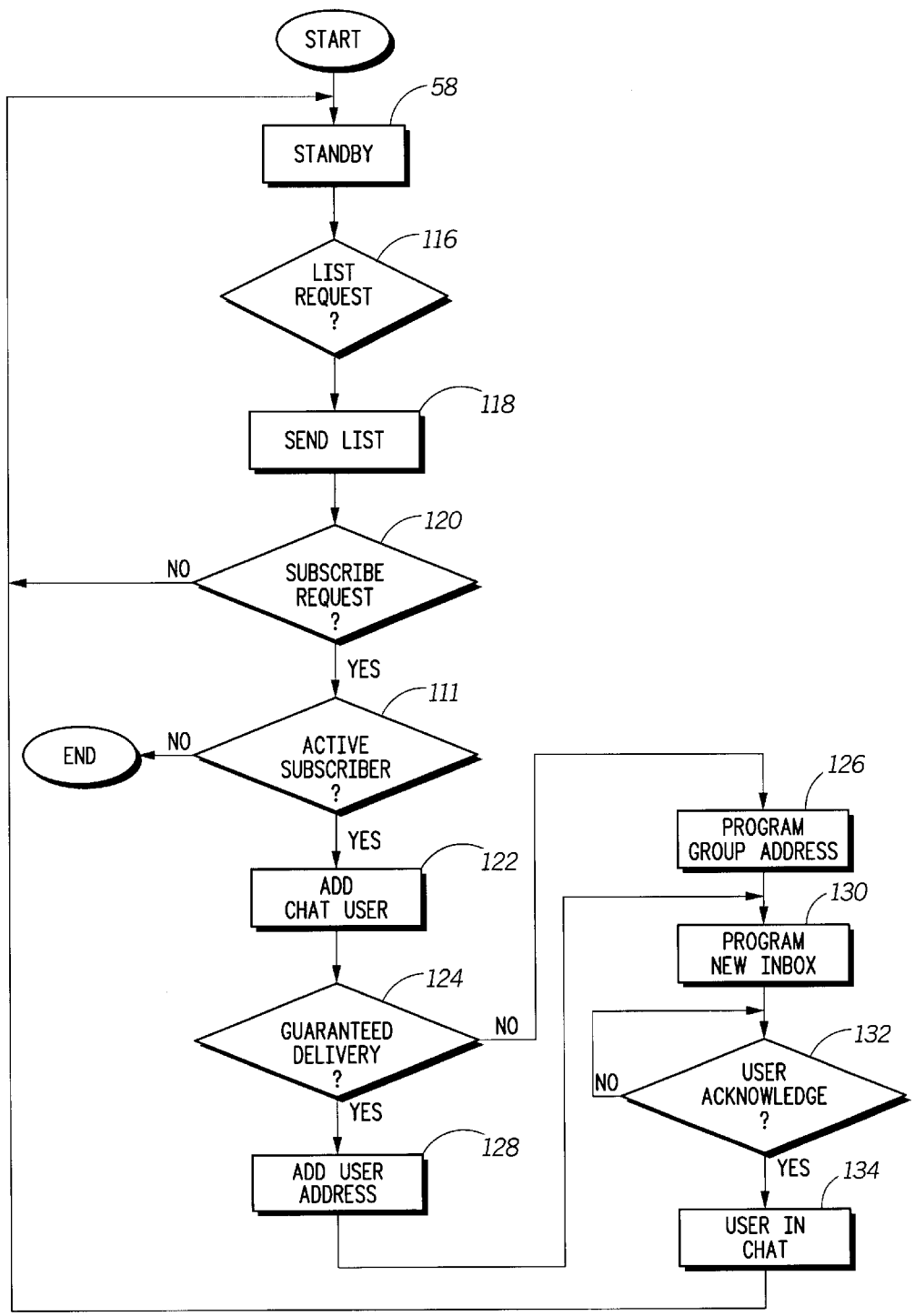

FIG. 6 is a flowchart illustrating the further operation of the chat server 48 in accordance with the present invention. The operation of FIG. 6 specifically relates to public chat topics residing on the chat server 48 and available to all requesting subscribers. In Step 58, the chat server 48 is in standby operation. In Step 116, the chat server 48 queries whether a request for a chat list has been received. When no request for a chat list has been received, the chat server 48 returns to the standby operation of Step 58. When a request for a chat list has been received, in Step 118 the chat server 48 sends a list of active chats to the requester. Next, in Step 120, the chat server 48 queries whether a topic subscription request has been received from a subscriber. When no subscribe topic request has been received, the chat server 48 returns to the standby operation of Step 58. In Step 111, when a topic subscription request has been received, the chat server 48 checks whether the subscriber account is active. When the subscriber account is not active, the process ends. When the subscriber account is active, In Step 122, the chat server 48 adds the user to the subscriber list for the requested topic. Next, in Step 124, the chat server 48 determines whether the requested topic includes a guaranteed delivery option. In Step 126, when no guaranteed delivery option is associated with the requested topic, the chat server 48 sends a programming message to the wireless communication device of the requester to program the group address of the requested topic. In Step 128, when a guaranteed delivery option is included in the requested topic, the chat server 48 adds the address for the requester user to the list of addresses associated with the chat topic requested. In Step 130, after the address is added to the list of addresses, or after the group address is programmed when there is a guaranteed delivery option, the chat server 48 sends a programming message to program a new inbox into the wireless communication device for the requested topic. Next, in Step 132, the chat server 48 queries for a user acknowledgement receipt from the requester. When no user acknowledgement has been received, the chat server 48 continues to query for a user acknowledgement. In Step 134, when the chat server 48 has received the user acknowledgement, the requesting user is activated in the requested chat topic. The chat server 48 then returns to the standby operation of Step 58.

In summary, when a user desires to chat, the chat server provides the user a list of active chat topics and gives the user the option to choose which chat to subscribe to and also the quality of service for that chat. In one embodiment, the service provider predefines the quality of service.

Figure 7:
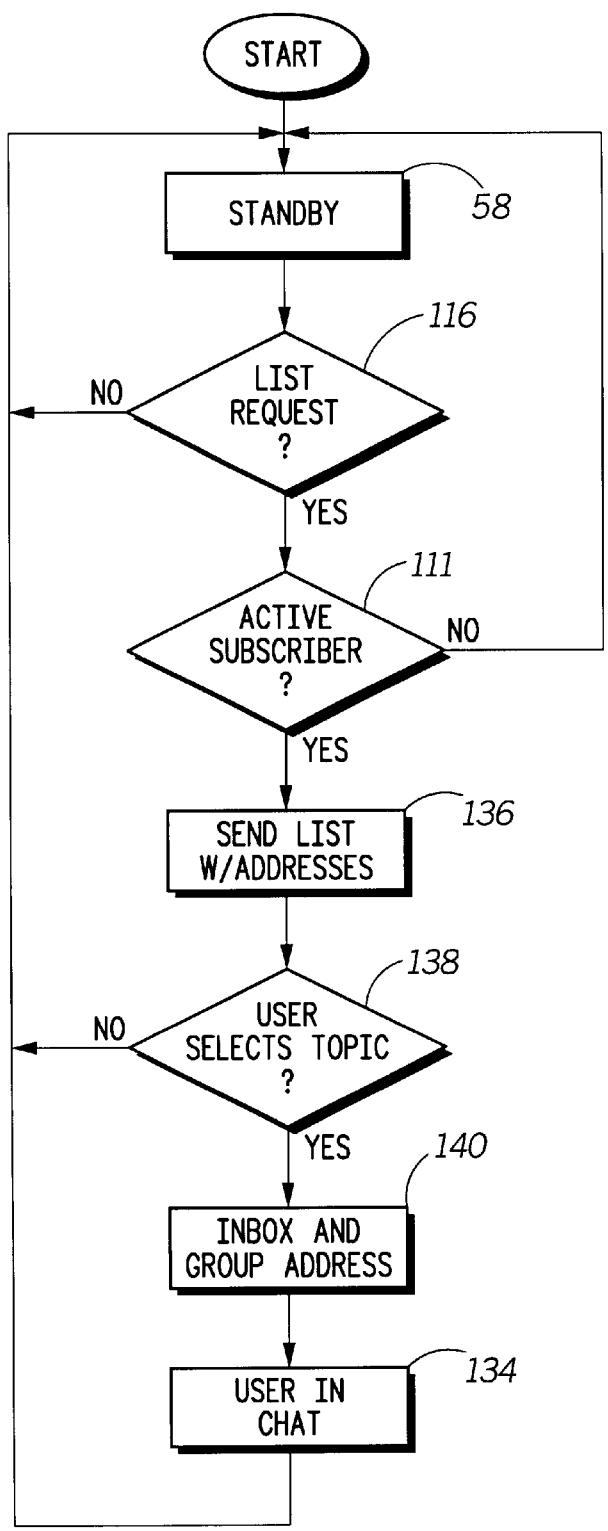

FIG. 7 is a flowchart illustrating an alternative operation of the chat server 48 in accordance with the present invention. In Step 58, the chat server 48 is in standby operation. In Step 116, the chat server 48 queries whether a request for a chat list has been received. When no request for a chat list has been received, the chat server 48 returns to the standby operation of Step 58. When a request for a chat list has been received, in Step 111, the chat server 48 checks whether the subscriber account is active. When the subscriber account is not active, the process returns to the standby operation of Step 58. When the subscriber account is active, in Step 136 the chat server 48 sends a list of active chats along with the group address for each active chat to the requester. In Step 138, the process queries whether the user has selected one or more active chat topics. When the user has not selected an active chat topic, the chat server 48 returns to the standby operation with no change to the chats. When the user selects a chat topic, in Step 140, the user's device adds the group address and an inbox for that chat topic. Next, in Step 134, the user is now part of the chat and the chat server 48 returns to the standby operation of Step 58.

The operation of FIG. 7 illustrates a method for giving the user more control over chat activities. One example in which this is preferable is free chat services such as those with attached advertisements.

Figure 8:
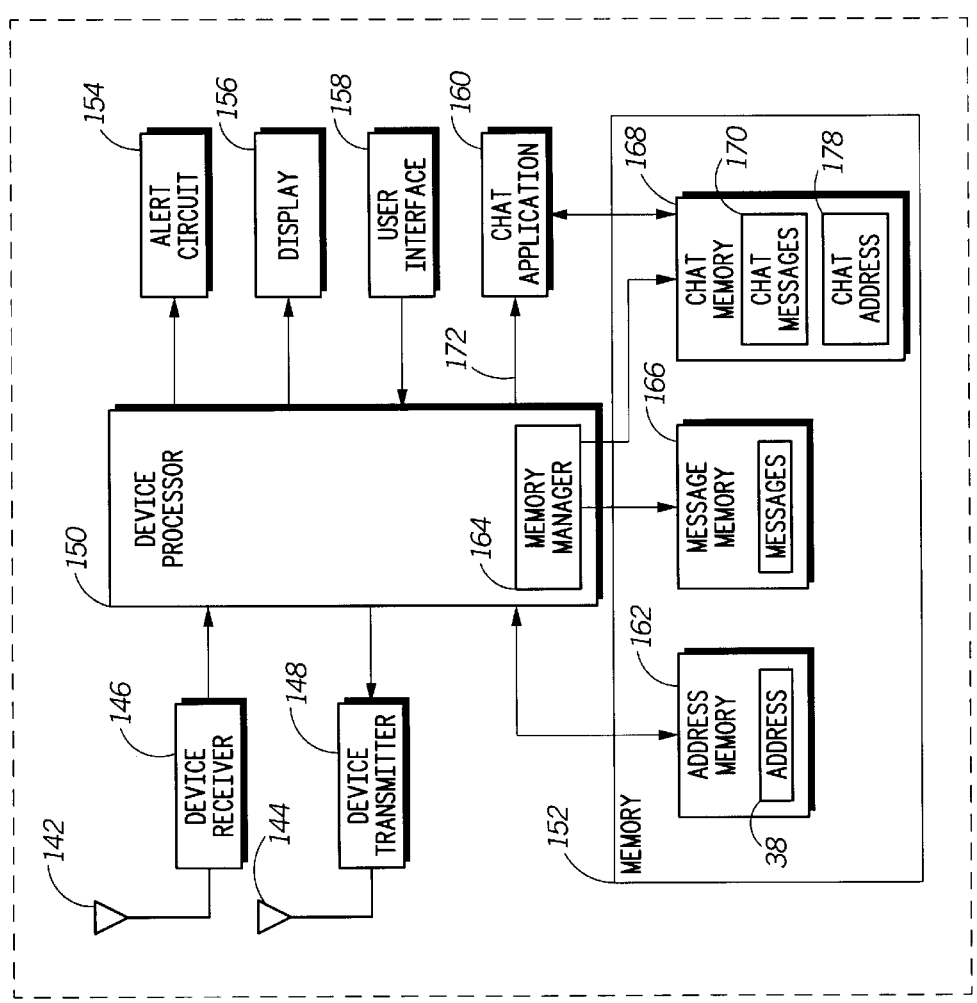
FIG. 8 is an electronic block diagram of a wireless communication device for use within the wireless communication system of FIG. 1.

FIG. 8 is an electronic block diagram of a preferred embodiment of the wireless communication device 36 for use within the wireless communication system 10. The wireless communication device 36 includes a first device antenna 142, a second device antenna 144, a device receiver 146, a device transmitter 148, a device processor 150, a device memory 152, an alert circuit 154, a display 156, a user interface 158, and a chat application 160.

The first device antenna 142 intercepts transmitted signals from the wireless communication system 10. The first device antenna 142 is coupled to the device receiver 146 which employs conventional demodulation techniques for receiving the communication signals transmitted by the wireless communication system 10 such as the downlink message 34.

Coupled to the device receiver 146, is a device processor 150 utilizing conventional signal processing techniques for processing received messages. Preferably, the device processor 150 is similar to the MC68328 micro-controller manufactured by Motorola, Inc. of Schaumburg, Ill. It will be appreciated that other similar processors can be utilized for the device processor 150, and that additional processors of the same or alternative type can be added as required to handle the processing requirements of the device processor 150.

The device processor 150 decodes an address in the demodulated data of the received downlink message 34, compares the decoded address with one or more addresses such as the address 38 stored in an address memory 162 of the device memory 152; and when a match is detected, proceeds to process the remaining portion of the received signal.

Preferably, the device processor 150 includes a memory manager 164. The memory manager 164 determines if the address of the decoded downlink message 34 is a chat address or a standard messaging address.

To perform the necessary functions of the wireless communication device 36, the device processor 150 is coupled to the device memory 152, which preferably includes a random access memory (RAM), a read-only memory (ROM), and an electrically erasable programmable read-only memory (EEPROM). The device memory 152 includes the address memory 162, a message memory 166, and a chat memory 168. Once the device processor 150 has processed the downlink message 34, it stores the downlink message 34 in the chat memory 168 if the address is a chat address and in the message memory 166 otherwise.

Figure 9:
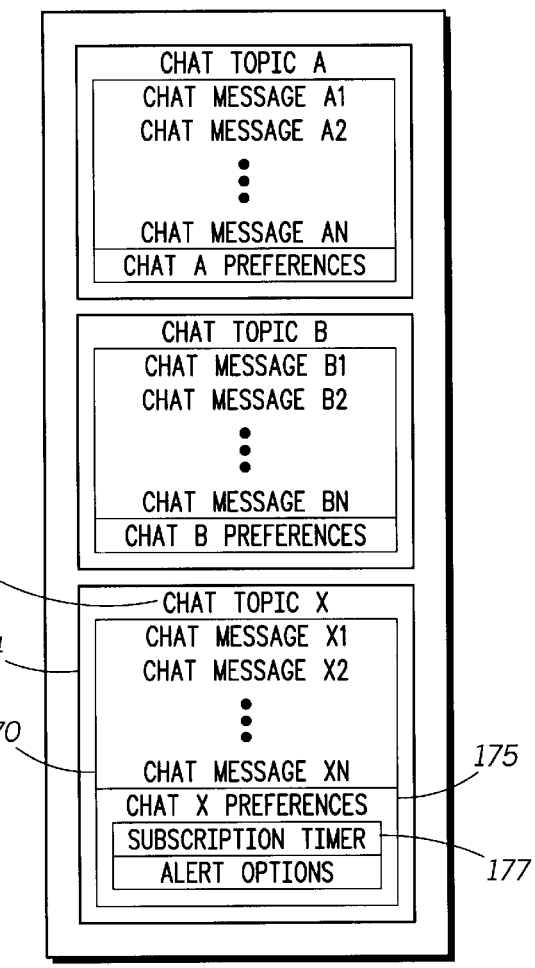
FIG. 9 is an illustration of the chat memory included within the wireless communication device of FIG. 8.

FIG. 9 is an illustration of the chat memory 168. The chat memory 168 includes a chat memory slot 174 for the chat topic 82 in which the wireless communication device 36 has subscribed. A plurality of chat messages 170 associated with the chat topic 82 is stored together in chronological order in the chat memory slot 174. The chat memory slot 174 is allocated a fixed amount of memory for storing associated plurality of chat messages 170. The chat memory slot 174 holds multiple chat messages in a single message slot. Any chat message received for the chat topic 82 is appended at the end of the plurality of chat messages 170 already in the chat memory slot 174. If the amount of allocated memory for the chat memory slot 174 is exceeded, the older chat messages are deleted. The chat memory slot 174 for the chat topic 82 preferably includes one or more chat preferences 175. The chat preferences 175 define the options chosen by the user for the chat topic 82. The chat preferences 175 may be, for example, an alert option such as alert on receipt of a new chat message or no alert on receipt of a new chat message, guaranteed or non-guaranteed delivery, timeout setting for participation in the chat, and number of chat messages to retain in history and display. In one embodiment, the chat preferences 175 includes a subscription timer 177. The subscription timer 177 is a preset time period upon which the wireless communication device 36 is active within the chat topic 82. One skilled in the art will recognize that the chat preferences 175 may be any of those mentioned above or an equivalent. The chat preferences 175 in one embodiment are set by the chat server 48 when the chat topic is activated. Alternatively, the chat preferences 175 are manually set by the user interface 158. A default set of chat preferences 175 typically is included either in the chat application 160 or the device processor 150 to enhance the efficiency of managing the chat topics.

Referring back to FIG. 8, the device processor 150 sends a command to the alert circuit 154 to notify a user that the downlink message 34 has been received and stored. The alert circuit 154 can include a speaker (not shown) with associated speaker drive circuitry capable of playing melodies and other audible alerts, a vibrator (not shown) with associated vibrator drive circuitry capable of producing a physical vibration, or one or more LEDs (not shown) with associated LED drive circuitry capable of producing a visual alert. It will be appreciated by one skilled in the art that other similar alerting means as well as any combination of the audible, vibratory, and visual alert outputs described can be used for the alert circuit 154.

Upon receipt of the downlink message 34, the device processor 150 preferably also sends a command to the display 156 to generate a visual notification of the receipt and storage of the downlink message 34. When the display 156 receives the command from the device processor 150 that the downlink message 34 has been received and stored in the device memory 152, an indication is displayed. The display 156 can be, for example, a full or partial starburst liquid crystal display utilized to display text. It will be appreciated that other similar displays such as dot matrix displays can be utilized for the display 156.

In a preferred embodiment, the wireless communication device 36 includes the chat application 160. The wireless communication device 36 performs chat functions within the chat application 160 using a plurality of chat messages 170 stored in the chat memory 168. The chat application 160 may be hard coded or programmed into the wireless communication device 36 during manufacturing, may be programmed over-the-air upon customer subscription, or may be a downloadable application. It will be appreciated that other programming methods can be utilized for programming the chat application 160 into the wireless communication device 36.

Preferably the chat application 160 automatically updates the display 156 when a new chat message has been received. This allows the message to be updated while the user is reading it without disturbing the display 156. One skilled in the art will recognize that wireless communication devices having software-programming capabilities may include specialized and personalized display options and screens for each chat topic. Alternatively, wireless communication devices that do not include software-programming capabilities may include standard, pre-defined display options and screens for chat topics.

The chat application 160 further includes various alert options. In one embodiment, the chat application 160 notifies the device processor 150 to send a command to the alert circuit 154 when a new chat message is added to the chat memory slot 174. In another embodiment, the chat application 160 notifies the device processor 150 to send a command to the alert circuit 154 when an unread chat message is to be deleted from the chat memory slot 174. Alternatively, no alert may be sent when a new chat message is received and stored in the chat memory 168. Those skilled in the art will appreciate that other alerting schemes are within the scope of the present invention.

Preferably, the user interface 158 is coupled to the device processor 150, as shown in FIG. 8. The device processor 150, in response to the user interface 158, such as a user depressing a button or series of buttons, or in response to receipt of a chat response 56 from the chat server 48, initiates an input signal 172 to the chat application 160. The chat application 160, in response to the input signal 172, accesses the plurality of chat messages 170 stored in the chat memory 168 for use in operation of the chat application 160.

The device transmitter 148 is coupled to the device processor 150 and is responsive to commands from the device processor 150. When the device transmitter 148 receives a command from the device processor 150, the device transmitter 148 sends a signal via the second device antenna 144 to the wireless communication system 10.

Figure 10:
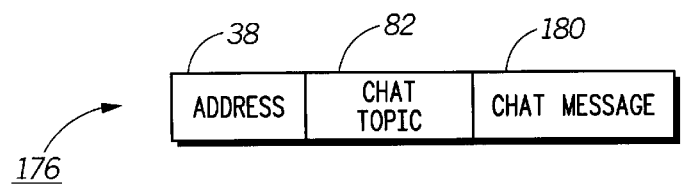
FIGS. 10 and 11 are embodiments of a protocol for communicating a chat message to the wireless communication device of FIG. 3.

FIG. 10 illustrates one embodiment of a protocol 176 for communicating a chat message to the wireless communication device 36. This protocol 176 is embedded within the downlink message 34 sent to the wireless communication device 36. The protocol 176 includes the address 38, a chat topic 82, and a chat message 180. The address 38 is typically a group address used by all subscribers whose devices were programmed with that group address to receive group messages in the case of non-guaranteed delivery or is an individual assigned address for that single wireless communication device 36 to receive messages in the case of guaranteed delivery. In the embodiment of FIG. 10, the chat topic 82 identifies to the device processor 150 that the downlink message 34 contains the chat message 180 and also the chat topic 82 for which the chat message 180 relates.

Figure 11:
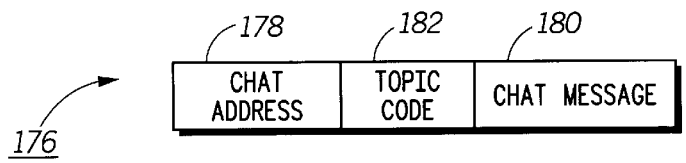

FIG. 11 illustrates an alternative embodiment of a protocol for communicating a chat message to the wireless communication device 36. This protocol 176 is embedded within a downlink message 34 sent to the wireless communication device 36. The protocol 176 includes a chat address 178, a topic code 182 and the chat message 180. In the embodiment of FIG. 11, the chat address 178 identifies to the device processor 150 that the downlink message 34 contains the chat message 180. The chat address 178 is a group address used by all subscribers to that chat topic 82 to receive the chat message 180 associated with the chat topic 82 in the case of non-guaranteed delivery or is an individual assigned address for that single wireless communication device 36 to receive the chat message 180 associated with the chat topic 82 in the case of guaranteed delivery. The topic code 182 then identifies to the device processor 150 the chat topic 82 for which the chat message 180 is associated with. Using one chat address for all chat topics is useful for pagers with limited address capacity.

Figure 12:
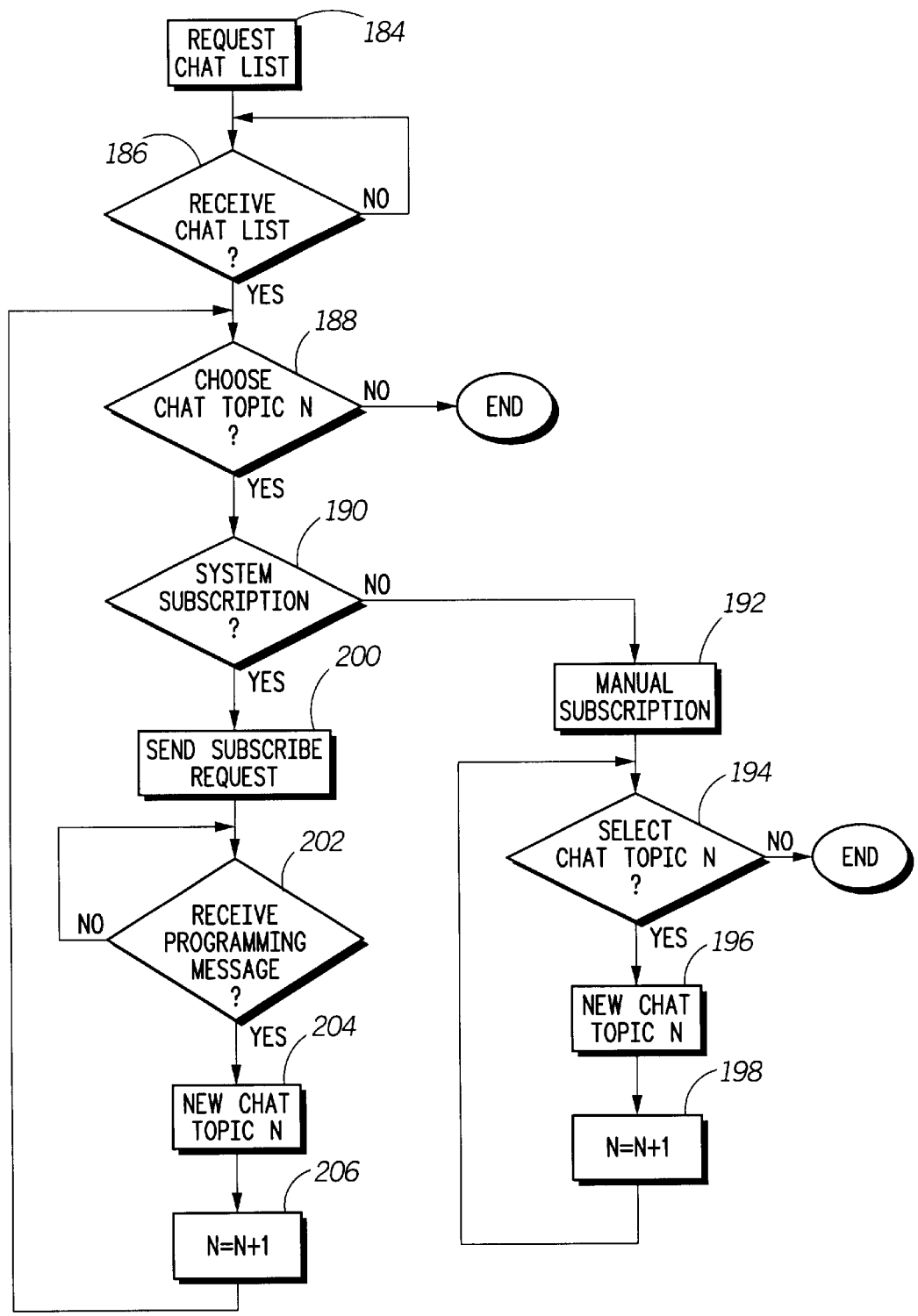
FIGS. 12 through 16 are flowcharts illustrating various embodiments of the operation of the wireless communication device of FIG. 8 in accordance with the present invention.

FIG. 12 is a flowchart illustrating one embodiment of the subscription to a new chat topic by the wireless communication device 36. In the embodiment of FIG. 12, the wireless communication device 36 is subscribing to a public chat topic. In Step 184, the wireless communication device 36 requests a list of active chats from the chat server 48. In one embodiment the request for the list of active chats is sent from the wireless communication device 36 as the chat request 54 via the inbound RF channel 42 directly to the chat server 48 when the chat server 48 includes the chat server address 50. In an alternative embodiment, the request for the list of active chats is sent from the wireless communication device 36 as the uplink message 44 to the system controller 22 via the receive antenna 40. In response to receipt of the uplink message 44, the system controller 22 communicates the chat request 54 to the chat server 48 via the server interface 52. In another embodiment, the requester sends the request for the list of active chats from an input device such as the telephone 12, computer 14, or desktop messaging unit 16. The request is sent through the PSTN 18 to the system controller 22. In response to receipt of the request from the PSTN 18, the system controller 22 communicates the chat request 54 to the chat server 48 via the server interface 52. It will be appreciated that the wireless communication system 10, in accordance with the present invention, may utilize any of the above methods for the request for the list of active chats or an equivalent.

Next, in Step 186 of FIG. 12, the wireless communication device 36 queries for receipt of the list of active chats from the chat server 48. When no list of active chats has been received, the wireless communication device 36 continues to periodically check for receipt. In one embodiment, the chat server 48 sends the list of active chats in the form of the chat response 56 directly to the wireless communication device 36 via the outbound RF channel 32. In an alternative embodiment, the chat server 48 sends the chat response 56 including the list of active chats to the system controller 22 via the server interface 52. In response to receipt of the chat response 56 from the chat server 48, the system controller 22 sends the downlink message 34 including the list of active chats to the wireless communication device 36. In Step 188, when the wireless communication device 36 receives the list of active chats, the device processor 150 of the wireless communication device 36 then queries for the selection of a chat topic. Preferably, the chat topic is selected when the user interface 158 sends a command to the device processor 150 which, in response to the command from the user interface 158, sends the input signal 172 to the chat application 160 notifying the chat application 160 of the selected topic. When no chat topic is selected, the process ends. In Step 190, when a new chat topic is selected, the device processor 150 of the wireless communication device 36 next determines whether the system is configured for system subscription of the selected chat topic.

In Step 192, when there is no system subscription, the device processor 150 sends the input signal 172 to the chat application 160 to initiate manual subscription. In Step 194, the chat application 160 verifies with the user that a new chat topic is desired. Preferably, the verification is done using the user interface 158. In Step 196, the chat application 160 then programs the chat memory 168 to include a new chat message slot for the new chat topic. In Step 198, a counter is incremented by one and the process returns to Step 194 to continue checking for further selected new chat topics.

In Step 200, when there is a system subscription option activated, the wireless communication device 36 sends a request to subscribe to the chat server 48. In one embodiment the request to subscribe is sent from the wireless communication device 36 as the chat request 54 via the inbound RF channel 42 directly to the chat server 48 when the chat server 48 includes the chat server address 50. In an alternative embodiment, the request to subscribe is sent from the wireless communication device 36 as the uplink message 44 to the system controller 22 via the receive antenna 40. In response to receipt of the uplink message 44, the system controller 22 communicates the chat request 54 to the chat server 48 via the server interface 52. In another embodiment, the requester sends the request to subscribe from an input device such as the telephone 12, computer 14, or desktop messaging unit 16. The request is sent through the PSTN 18 to the system controller 22. In response to receipt of the request from the PSTN 18, the system controller 22 communicates the chat request 54 to the chat server 48 via the server interface 52. It will be appreciated that the wireless communication system 10, in accordance with the present invention, may utilize any of the above methods for the request to subscribe or an equivalent.

Next, in Step 202 of FIG. 12, the wireless communication device 36 queries for receipt of a programming message from the chat server 48. When no programming message has been received, the wireless communication device 36 continues to periodically check for receipt. In one embodiment, the chat server 48 sends the programming message in the form of the chat response 56 directly to the wireless communication device 36 via the outbound RF channel 32. In an alternative embodiment, the chat server 48 sends the chat response 56 including the programming message to the system controller 22 via the server interface 52. In response to receipt of the chat response 56 from the chat server 48, the system controller 22 sends the downlink message 34 including the programming message to the wireless communication device 36. In Step 204, when the programming message is received, the new chat topic is added to the chat memory 168. In Step 206, the counter is then incremented by one and the device processor 150 returns to Step 188 and continues to query for selection of another chat topic.

In summary, the wireless communication device receives a list of active chat topics from the chat server and chooses to subscribe. Subscription may be accomplished either through a request to the system and subsequent programming or via the user interface by manually subscribing.

Figure 13:
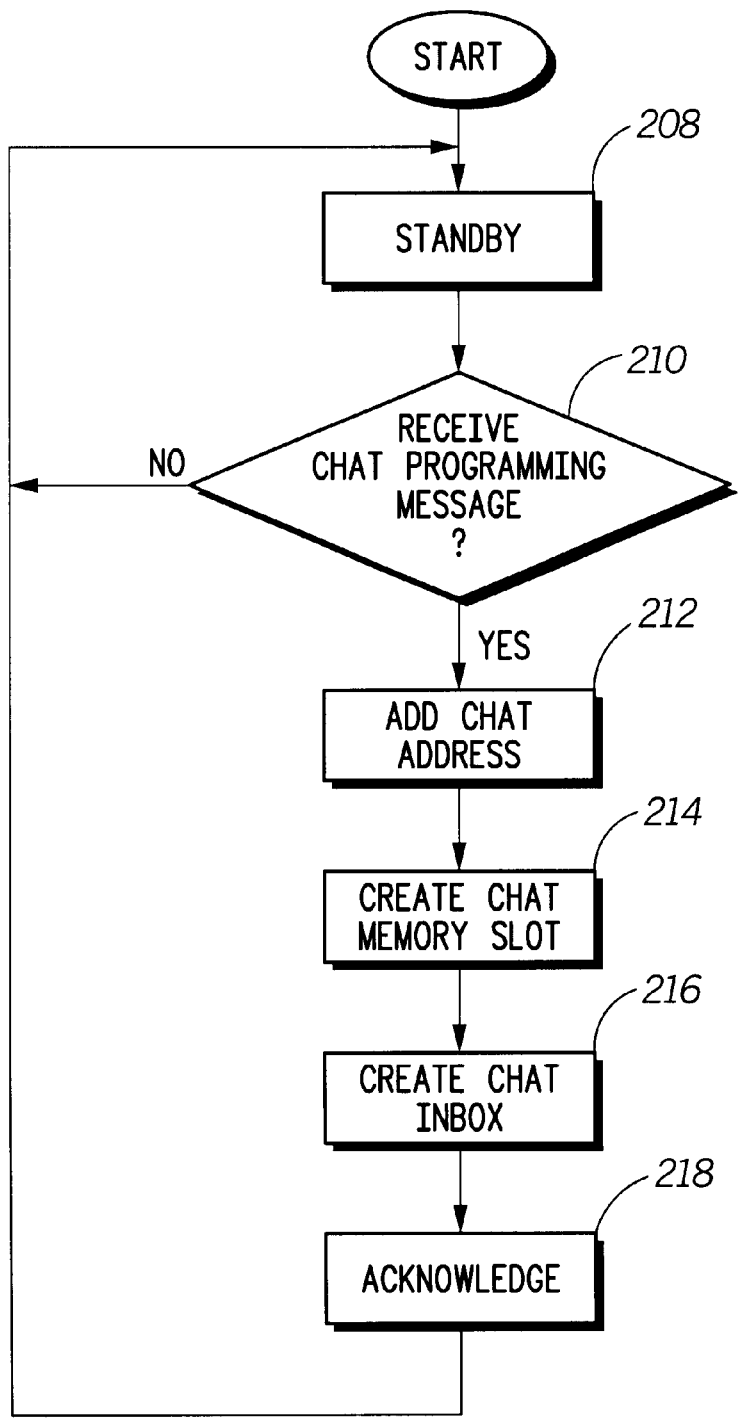

FIG. 13 is a flowchart illustrating an alternative embodiment of the subscription to a new chat topic by the wireless communication device 36. In the embodiment of FIG. 13, the wireless communication device 36 is being added as a subscriber to a private chat topic. In Step 208, the wireless communication device 36 is in the standby operation. In Step 210, the wireless communication device 36 queries for receipt of a new chat programming message. When no chat programming message has been received, the wireless communication device 36 returns to the standby operation of Step 208. In Step 210, when a chat programming message is received, the chat address 178 for the chat topic 82 is added to the chat memory 168 in Step 212. Next, in Step 214, the chat memory slot 174 is created in the chat memory 168 corresponding to the chat topic 82. In Step 216, a new chat inbox is created corresponding to the chat topic 82. Next, in Step 218, the wireless communication device 36 sends an acknowledge message to the chat server 48. In one embodiment the acknowledge message is sent from the wireless communication device 36 as the chat request 54 via the inbound RF channel 42 directly to the chat server 48 when the chat server 48 includes the chat server address 50. In an alternative embodiment, the acknowledge message is sent from the wireless communication device 36 as the uplink message 44 to the system controller 22 via the receive antenna 40. In response to receipt of the uplink message 44, the system controller 22 communicates the chat request 54 to the chat server 48 via the server interface 52. In another embodiment, the requester sends the acknowledge message from an input device such as the telephone 12, computer 14, or desktop messaging unit 16. The request is sent through the PSTN 18 to the system controller 22. In response to receipt of the request from the PSTN 18, the system controller 22 communicates the chat request 54 to the chat server 48 via the server interface 52. It will be appreciated that the wireless communication system 10, in accordance with the present invention, may utilize any of the above methods for the acknowledge message or an equivalent.

Figure 14:
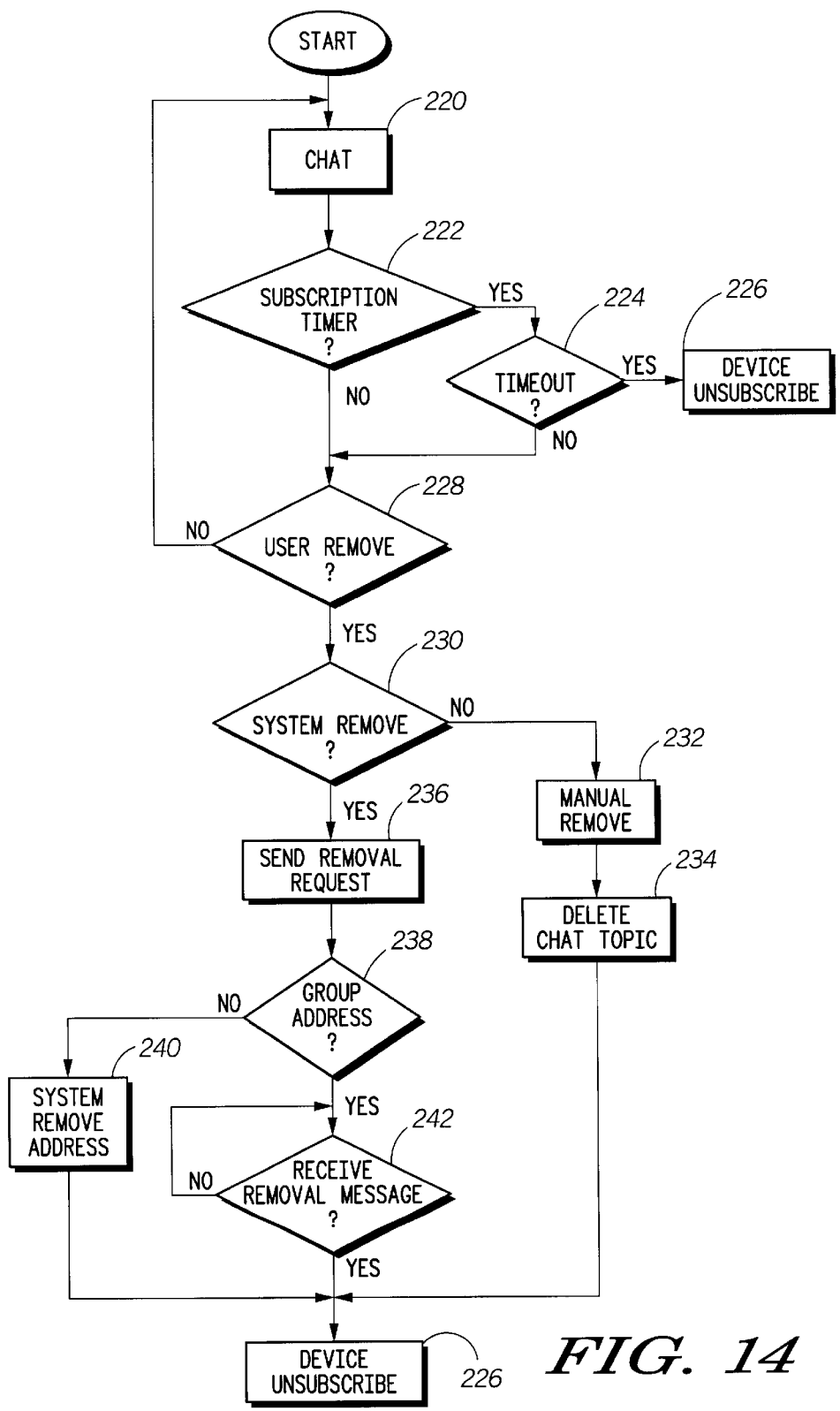

FIG. 14 is a flowchart illustrating the removal of a subscription to a chat topic by the wireless communication device 36. In Step 220, the wireless communication device 36 is active as a chat topic subscriber. In Step 222, the wireless communication device 36 queries for the presence of a subscription timer for the chat topic. A subscription timer is a preset time period upon which the wireless communication device 36 is active within the chat. It is typically set at the time of subscription. The subscription timer in one embodiment is set by the user at the tie of subscription by sending a subscribe topic time limit request to the chat server 48 at the time of subscription. Alternatively, the chat server 48 sets the subscription timer at the time of subscription per the service options associated with the chat topic 82. In Step 224, when a subscription timer is present, the wireless communication device 36 determines if the subscription timer has timed out. In Step 226, when the subscription timer has timed out, the wireless communication device 36 is unsubscribed from the chat topic 82. To unsubscribe from the chat topic 82, the device processor 150, in response to the time out of the subscription timer, sends the input signal 172 to the chat application 160. The chat application 160, in response to the input signal 172, removes the chat topic 82 including the chat address 178 from the chat memory 168 and deletes any chat inbox on the display 156 for the chat topic 82.

In Step 228, when the subscription timer has not timed out, or when there is no subscription timer, the wireless communication device 36 queries for a user chat topic removal request. In one embodiment, the chat topic removal request is initiated by the user interface 158 sending a removal command to the device processor 150. When there is no chat topic removal request, the wireless communication device 36 continues to be active in the chat, returning to Step 220. In Step 230, when there is a chat topic removal request, the wireless communication device 36 next checks for a system removal option. The system removal option gives the chat server 48 the responsibility to remove the wireless communication device 36 from the chat. In Step 232, when there is no system removal option, a manual removal is initiated. In Step 234, the chat topic 82 is deleted from the wireless communication device 36 and the device is unsubscribed in Step 226. Unsubscribing includes removing the chat topic inbox and deleting the chat messages from the chat memory. Preferably, to accomplish the unsubscribing, the user interface 158 sends a command to the device processor 150 to remove the chat topic 82. The device processor 150 in response to the command from the user interface 158 sends the input signal 172 to the chat application 160. The chat application 160, in response to the input signal 172, removes the chat topic 82 including the chat address 178 and the chat memory slot 174 from the chat memory 168 and deletes the chat inbox on the display 156 for the chat topic 82.

In Step 236, when there is a system removal option, the wireless communication device 36 sends a removal request to the chat server 48. In one embodiment the removal request is sent from the wireless communication device 36 as the chat request 54 via the inbound RF channel 42 directly to the chat server 48 when the chat server 48 includes the chat server address 50. In an alternative embodiment, the removal request is sent from the wireless communication device 36 as the uplink message 44 to the system controller 22 via the receive antenna 40. In response to receipt of the uplink message 44, the system controller 22 communicates the chat request 54 to the chat server 48 via the server interface 52. In another embodiment, the requester sends the removal request from an input device such as the telephone 12, computer 14, or desktop messaging unit 16. The request is sent through the PSTN 18 to the system controller 22. In response to receipt of the request from the PSTN 18, the system controller 22 communicates the chat request 54 to the chat server 48 via the server interface 52. It will be appreciated that the wireless communication system 10, in accordance with the present invention, may utilize any of the above methods for the removal request message or an equivalent. Next, in Step 238, the chat server 48 determines whether there is a group address associated with the chat topic or whether the chat topic is managed by individual addresses. In Step 240, when there is not a group address, the chat server 48 removes the address 38 for the wireless communication device 36 from the list of chat users associated with the chat topic 82 in the chat server memory 70 of the chat server 48 and the device is unsubscribed in Step 226. In Step 242, when there is no group address, the wireless communication device 36 remains active in the chat awaiting receipt of a removal message from the chat server 48. When no removal message has been received, the wireless communication device 36 continues to periodically check for receipt. In one embodiment, the chat server 48 sends the removal message in the form of the chat response 56 directly to the wireless communication device 36 via the outbound RF channel 32. In an alternative embodiment, the chat server 48 sends the chat response 56 including the removal message to the system controller 22 via the server interface 52. In response to receipt of the chat response 56 from the chat server 48, the system controller 22 sends the downlink message 34 including the removal message to the wireless communication device 36. In Step 226, when the removal message is received, the wireless communication device 36 is unsubscribed from the chat topic 82. To unsubscribe from the chat topic 82, the device processor 150, in response to the time out of the subscription timer, sends the input signal 172 to the chat application 160. The chat application 160, in response to the input signal 172, removes the chat topic 82 including the chat address 178 from the chat memory 168 and deletes any chat inbox on the display 156 for the chat topic 82.

In summary, when a subscription timer times out, a user requests to be removed from a chat discussion, or an equivalent event occurs which indicates removal of the user from the chat, all associated chat resources are shut down and memory freed up for other uses.

Figure 15A:
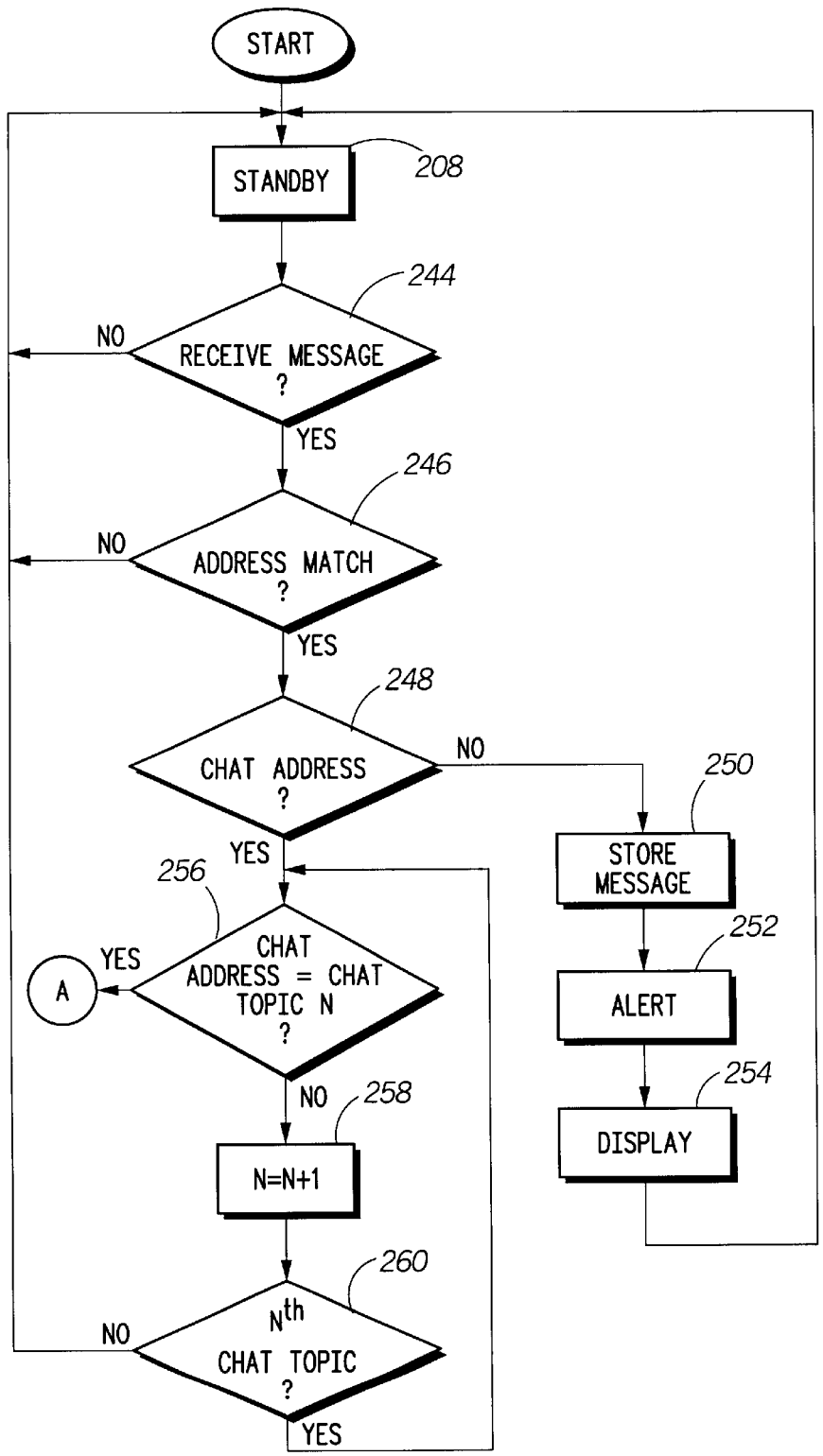
Figure 15B:
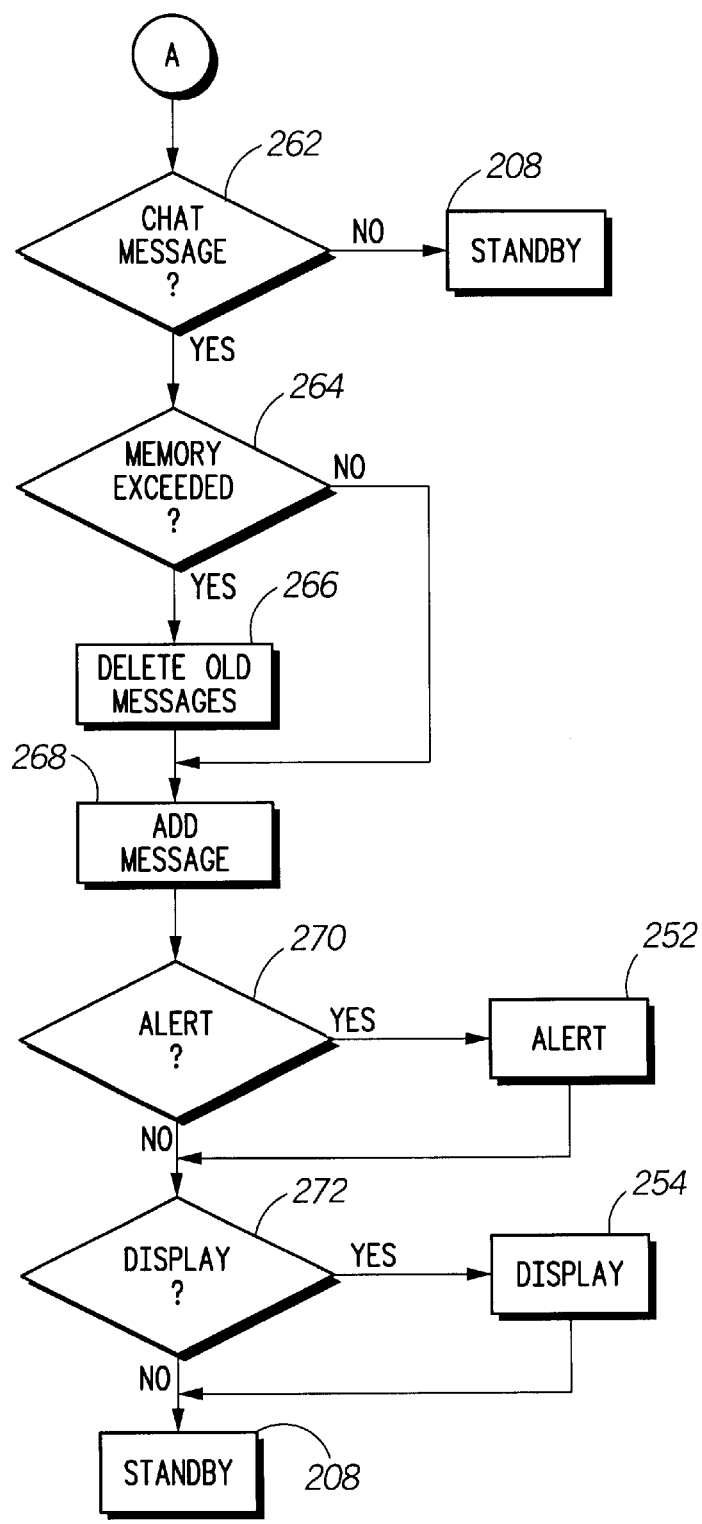

FIG. 15 is a flowchart illustrating the operation of the wireless communication device 36 when active in one or more chat discussions. In FIG. 15, the protocol of FIG. 10 is utilized for communication of the chat message 180. In Step 208, the wireless communication device 36 is in the standby operation. In Step 244, the device processor 150 queries for receipt of a message such as the downlink message 34. When no message is received, the wireless communication device 36 returns to the standby operation of Step 208. In Step 246, when there is a message, the device processor 150 checks for a match between the address 38 of the received message and addresses stored in the address memory 162. When there is not an address match, the wireless communication device 36 returns to the standby operation of Step 208. In Step 248, when there is an address match, the device processor 150 determines whether the message includes the chat address 178. In Step 250, when the received message does not contain the chat address 178, the memory manager 164 of the device processor 150 processes the message as a standard wireless message by first storing the message in the message memory 166. Next, in Step 252, the device processor 150 sends a command to the alert circuit 154 to notify a user that the message has been received and stored. The notification may be playing melodies and other audible alerts, a physical vibration, or a visual alert. It will be appreciated by one skilled in the art that other notifications or any combination of the audible, vibratory, and visual alerts described can be used for the notification. Next, in Step 254, the device processor 150 sends a command to the display 156 to generate a visual notification of the receipt and storage of the message. When the display 156 receives the command from the device processor 150 that the message has been received and stored in the message memory 166, an indication is displayed. The wireless communication device 36 thereafter returns to the standby operation of Step 208.

In Step 256, when the received message includes the chat address 178, the device processor 150 compares the chat address 178 to the chat address of the first chat topic N. In Step 258, when the chat address 178 does not match the chat address of the first chat topic N, a counter is incremented to N=N+1. Next, in Step 260, the device processor 150 determines whether there is an Nth chat topic stored in the chat memory 168. When there is no Nth chat topic, the wireless communication device 36 returns to the standby operation of Step 208. When there is an Nth chat topic, the process returns to Step 256 and the device processor 150 compares the chat address 178 to the chat address of the chat topic N. In Step 262, when the chat address 178 matches the chat address of the Nth chat topic, the device processor 150 determines whether the message includes the chat message 180. When the received message does not contain the chat message 180, the wireless communication device 36 returns to the standby operation of Step 208. In Step 264, when the message includes the chat message 180, the memory manager 164 of the device processor 150 determines whether the memory allocation for the Nth chat topic has been exceeded. In Step 266, when the memory allocation has been exceeded, the memory manager 164 deletes the older pages until the memory limit is no longer exceeded. Preferably, the memory manager 164 is programmed with a buffer limit, which is added to the memory limit to determine how much to delete. The buffer limit facilitates allowance of enough memory for the storage of the newly received chat messages. In Step 268, after the old pages have been deleted, or when the memory allocation is not exceeded, the new chat message is added to the chat messages 170 for the Nth chat topic. Next, in Step 270, the device processor 150 determines whether the chat topic includes the option of alerting upon receipt of a new chat message. This determination preferably includes communication with the chat application 160, which stores the options for the chat topics. When the alerting option is included for the chat topic, in Step 252 the device processor 150 sends a command to the alert circuit 154 to notify the user that the chat message has been received and stored. In Step 272, when there is no alert option for receiving new chat messages, or after the alert command has been sent, the device processor 150 determines whether a visual display update option has been chosen for the chat topic N. In Step 254, when there is a visual display automatic update the device processor 150 updates the display to show the new chat message. Preferably the new chat message is appended to the bottom of the displayed chat topic messages. Next, when the display has been updated, or when there is no display update option, the wireless communication device 36 returns to the standby operation of Step 208.

Figure 16:
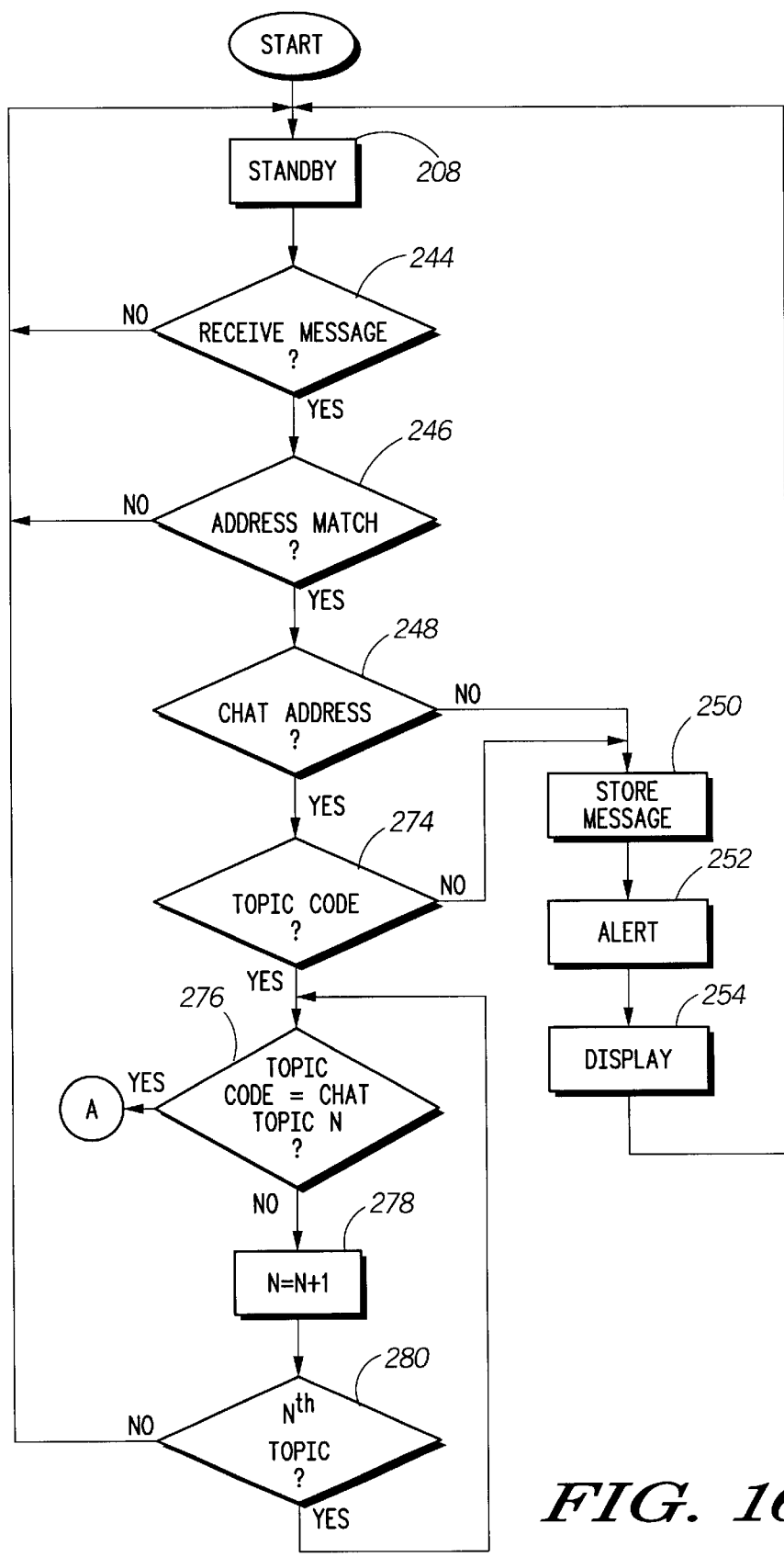

FIG. 16 is a flowchart illustrating an alternative embodiment of the operation of the wireless communication device 36 when active in one or more chat discussions. In FIG. 16, the protocol of FIG. 11 is utilized for communication of the chat message 180. In Step 208, the wireless communication device 36 is in the standby operation. In Step 244, the device processor 150 queries for receipt of a message such as the downlink message 34. When no message is received, the wireless communication device 36 returns to the standby operation of Step 208. In Step 246, when there is a message, the device processor 150 checks for a match between the address 38 of the received message and addresses stored in the address memory 162. When there is not an address match, the wireless communication device 36 returns to the standby operation of Step 208. In Step 248, when there is an address match, the device processor 150 determines whether the message includes the chat address 178. In Step 250, when the received message does not contain the chat address 178, the memory manager 164 of the device processor 150 processes the message as a standard wireless message by first storing the message in the message memory 166. Next, in Step 252, the device processor 150 sends a command to the alert circuit 154 to notify a user that the message has been received and stored. The notification may be playing melodies and other audible alerts, a physical vibration, or a visual alert. It will be appreciated by those skilled in the art that other notifications or any combination of the audible, vibratory, and visual alerts described can be used for the notification. Next, in Step 254, the device processor 150 sends a command to the display 156 to generate a visual notification of the receipt and storage of the message. When the display 156 receives the command from the device processor 150 that the message has been received and stored in the message memory 166, an indication is displayed. The wireless communication device 36 thereafter returns to the standby operation of Step 208.

In Step 274, when the received message includes the chat address 178, the device processor 150 determines whether the received message includes the topic code 182. When there is no topic code 182, the process goes to Step 250 and proceeds through Steps 250, 252, and 254 as previously described. In Step 276, when there is a topic code, the device processor 150 compares the topic code 182 to the topic code of the first chat topic N. In Step 278, when the topic code 182 does not match the topic code of the first chat topic N, a counter is incremented to N=N+1. Next, in Step 280, the device processor 150 determines whether there is an Nth chat topic stored in the chat memory 168. When there is no Nth chat topic, the wireless communication device 36 returns to the standby operation of Step 208. When there is an Nth chat topic, the process returns to Step 276 and the device processor 150 compares the topic code 182 to the topic code of the chat topic N. The process then continues to Step 262 and thereafter as described previously.

The present invention as described above facilitates the management of a plurality of chat discussions among a plurality of chat users using wireless communication systems. Wireless attributes, for example the mobility wireless offers to the chat user, not found in Internet and other wired chat approaches have not been utilized in the past due to special needs of the wireless systems. The present invention as described compensates for the requirements of wireless communication systems such as cost per character, limited bandwidth, and channel throughput while taking full advantage of the attributes that wireless brings to chat discussions.

Although the invention has been described in terms of preferred embodiments, it will be obvious to those skilled in the art that various alterations and modifications may be made without departing from the invention. Accordingly, it is intended that all such alterations and modifications be considered as within the spirit and scope of the invention as defined by the appended claims.

What is claimed is:

1. Within a wireless communication system, a method for communicating a chat topic between a chat server and a wireless communication device, the method comprising:
   within the chat server:
      receiving a request for active chat topics from the wireless communication device, wherein the request is sent from the wireless communication device to the chat server via an inbound radio frequency channel,
      sending a chat response to the wireless communication device, wherein the chat response is sent from the chat server to the wireless communication device via an outbound radio frequency channel, and further wherein the chat response comprises:
         the active chat topics along with an associated unique chat address and an associated one or more chat preferences for each of the active chat topics, wherein the one or more chat preferences define one or more operations to be performed by the wireless communication device when communicating within the active chat topic;
   within the wireless communication device:
      selecting at least one of the active topics,
      storing the chat address and the one or more chat preferences associated with the selected at least one of the active topics, and
      sending a request for subscription: and
   within the chat server:
      receiving the request for subscription from the wireless communication device, wherein the request for subscription is sent from the wireless communication device to the chat server via the inbound radio frequency channel, and further wherein the request for subscription comprises:
         the chat server address,
         an address identifying the wireless communication device, and
         a subscription request including at least one of the active chat topics; and
      adding the address of the wireless communication device to the at least one of the active chat topics.

2. In a wireless communication device, a method for participating within a chat topic including:
   sending a request for active chat topics to a chat server, wherein the request is sent from the wireless communication device to the chat server via an inbound radio frequency channel;
   receiving a chat response from the chat server, wherein the chat response is received from the chat server by the wireless communication device via an outbound radio frequency channel, and further wherein the chat response comprises:
      the active chat topics, wherein each of the active chat topics includes a chat address for identifying the chat topic and one or more associated chat preferences;
   selecting at least one of the active chat topics;
   storing the chat address and the one or more associated chat preferences for the selected at least one of the active chat topics in a chat memory slot for the active chat topic;
   receiving a message comprising the chat address and a chat message;
   identifying one or more operations to be performed using the one or more chat preferences in response to receiving the chat message; and
   performing the one or more identified operations.

3. The method for participating within a chat topic as recited in claim 2 further comprising:
   sending an acknowledgment to the chat server, wherein the acknowledgement is sent from the wireless communication device to the chat server via the inbound radio frequency channel and further wherein the acknowledgement comprises:
      the chat server address,
      an address identifying the wireless communication device, and
      the selected at least one of the active chat topics.

4. The method for participating within a chat topic as recited in claim 3 further comprising:

sending a request for chat removal from the wireless communication device to the chat server; and deleting the address of the wireless communication device from the chat server.

5. The method for participating within a chat topic as recited in claim 2 further comprising:

sending a chat message to the chat server wherein the chat message is sent from the wireless communication device to the chat server via the inbound radio frequency channel, and further wherein the chat message comprises:

an address identifying the wireless communication device, the chat address for the at least one of the active chat topics, and the chat message.

6. The method for participating within a chat topic as recited in claim 2 further comprising:

sending a chat message to a plurality of wireless communication devices, wherein the chat message is sent from the wireless communication device to the plurality of wireless f communication devices via the outbound radio frequency channel, and further wherein the chat message comprises:

an address identifying the wireless communication device, the chat address for at least one of the active chat topics, and the chat message.

7. The method for participating within a chat topic as recited in claim 2 further comprising:

sending a chat message to the chat server wherein the chat message is sent from the wireless communication device to the chat server via the inbound and outbound radio frequency channel, and further wherein the chat message comprises:

the chat address, a topic code for identifying a chat topic of the chat message; and the chat message.

8. The method for participating within a chat topic as recited in claim 2 further comprising:

sending a chat message to a plurality of wireless communication devices, wherein the chat message is sent from the wireless communication device to the plurality of wireless communication devices via the inbound and outbound radio frequency channel, and further wherein the chat message comprises:

the chat address, a topic code for identifying a chat topic of the chat message; and the chat message.

\* \* \* \* \*